Sept. 6, 1927.  A. LAUKHUFF  1,641,766
SPEED REDUCER
Filed Jan. 24, 1925
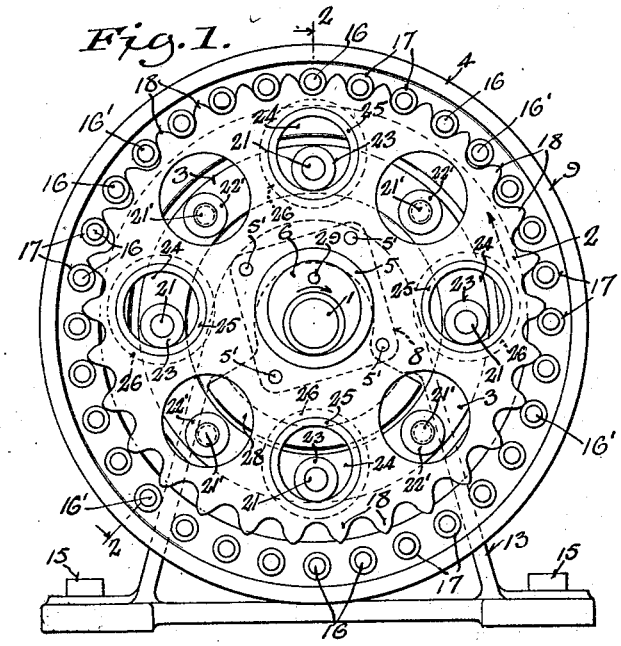
INVENTOR.
ALFRED LAUKHUFF
BY
Bottum, Hudnall, Secher and McNamara,
ATTORNEYS.

Patented Sept. 6, 1927.

1,641,766

UNITED STATES PATENT OFFICE.

ALFRED LAUKHUFF, OF SHOREWOOD, WISCONSIN.

SPEED REDUCER.

Application filed January 24, 1925. Serial No. 4,374.

My invention relates to improvements in speed reducers and more particularly to the type shown in Patent No. 1,502,787 issued to me July 29, 1924, and employing a rotary driving member eccentrically mounted on a drive shaft and imparting differential rotary movement to a second or driven member.

In speed reducers used heretofore, such as is shown and described in my above patent, the driving member is a gear of standard design, and enclosed by a suitable casing provided on the interior thereof with gear teeth with which the teeth of the driving member or gear mesh, the casing being concentric with the drive shaft and the driving gear being eccentrically mounted thereon whereby rotary movement is imparted to the driving gear upon rotation of the drive shaft and the consequent coaction of the gear teeth. The teeth of the casing are greater in number than those of the driving gear, depending upon the reduction or speed-ratio desired. The principal of operation of these speed reducers, briefly, is that as the teeth of the driving gear enter into mesh with those of the casing upon rotation of the drive shaft, there is a sliding action between the teeth which causes the driving gear to travel around the casing which is fixed against rotary movement with respect to the shaft, the extent of rotary movement imparted to the driving gear depending directly upon the ratio of the number of teeth of the casing to the number of teeth of the driving gear. It has been found from experience that upon continued use of speed reducers of this type, the coaction or sliding friction between the teeth of the casing and those of the driving gear causes wear of the teeth which is very perceptible, and which, in fact, after a comparatively short period of time causes so much looseness or free movement between the driving gear and casing that renewal of these parts is made necessary. Although speed reducers of this general type are particularly useful for providing a reduction of speed in many different types of machines, the rapid wear between the teeth caused by this sliding action between those of the casing and those of the gear wheel has made their extensive use prohibitive for the reason that the parts must be frequently replaced to maintain the proper working action and efficiency. These speed reducers heretofore used, furthermore, are so constructed that they are assembled with considerable difficulty and the cost of manufacture thereof is so great for these and other reasons that it has been necessary in many instances to use speed reducers of different types, which types, however, have not the same ease of operation.

One of the objects of the present invention, therefore, is to provide an improved speed reducer of the type described in which sliding friction between the driving member or gear and the casing therefor is eliminated.

Another object is to provide an improved speed reducer of the type described which may be readily assembled and which has many advantages over those heretofore constructed as regards simplicity of design, ease of operation and cost of manufacture.

Other objects and advantages will hereinafter appear.

For the purpose of illustrating the invention an embodiment thereof is shown in the drawings, in which—

Figure 1 is a front elevation, with one half of the casing and one half of the driven member removed, looking toward the left in Fig. 2;

Fig. 2 is a section on line 2—2 of Fig. 1;

Fig. 3 is a plan view of one half of the driven member;

Fig. 4 is a sectional view, showing a modified form;

Fig. 5 is a section on line 5—5 of Fig. 4;

Fig. 6 is a sectional view showing a modification; and

Fig. 7 is a fragmentary view of one of the parts in Fig. 6.

The device comprises, in general, a drive shaft 1, a driving member 2 eccentrically mounted thereon, a driven member 3 mounted for rotation about the axis of rotation of the shaft and connected to driving member 2 for rotation therewith, and a casing 4 with which the driving member 2 cooperates whereby rotary movement thereof with respect to the casing is effected upon rotation of the drive shaft.

Referring more particularly to Figs. 1 and 2, the driving member 2 comprises a flanged bushing 5 fitted upon an eccentric 6 fixed to shaft 1, and a pair of similar gears 7 fitted upon bushing 5 and in concentric relation therewith, the flange 8 of the bushing being square, as shown, and arranged between gears 7. The gears 7 and bushing 5 are held together and fixed in assembled relation by any suitable means such as rivets 5' passing through registering openings in the gears and flange 8.

The casing 4, as preferably made, comprises two halves 9 and 10, similarly formed and mounted upon drive shaft 1 in concentric relation therewith by means of their respective collars 11 and 12. For the purpose of supporting casing 4 and holding the same against rotation with respect to shaft 1, suitable brackets or supports 13 may be fitted upon collars 11 and 12 as shown, and suitable means such as set screws 14 provided for preventing rotation of the casing with respect to the brackets and shaft 1. The brackets may be screwed to a suitable base by means of bolts 15 to hold the device in operative position. Each of pins 16 may be supported at one end thereof by the half 9 of casing 4 and have a press fit therein for the purpose hereinafter explained. The opposite ends of pins 16 may be supported by half 10 of the casing and loosely fitted therein to permit this half to be readily removed for gaining access to the interior of the device. Rollers 17 are loosely mounted or journaled on pins 16 and adapted to mesh or coact with the teeth 18 of driving member 2, the number of rollers 17 being greater than the number of teeth 18, depending upon the reduction or speed-ratio desired. As shown in Figs. 1 and 2, several of the pins 16' may be extended through the halves 9 and 10 of the casing and nuts 17 threaded upon the ends thereof for the purpose of holding the halves of the casing securely together.

From the foregoing it will be seen that as drive shaft 1 and eccentric 6 fixed thereto rotate in the direction of the arrow shown in full line in Fig. 1, the teeth 18 of driving gears 2 will mesh or coact with rollers 17 and thereby effect rotary movement of gears 2 with respect to casing 4 in the direction of the arrow shown in dash lines, the rate of this rotary movement of gears 2 depending directly upon the difference between the number of rollers 17 and the number of teeth 18. As this action occurs, the action or thrust of teeth 18 against rollers 17 will cause the latter to rotate on their respective pins thereby eliminating the sliding friction and excessive wear of the gear teeth which occurs in the speed reducers heretofore used.

The construction of driven member 3 and the manner of connecting it to driving member 2 for rotation therewith will now be described. The driven member 3, as preferably made, comprises two similar parts 19 provided with collars 20 mounted loosely upon drive shaft 1 and loosely fitting collars 11 and 12 of the halves of casing 4, pins 21 having a press fit in suitable openings in the left-hand part 19, as viewed in Fig. 2, and a loose fit in registering openings 22 in the right-hand part 19, these pins providing journals for suitable rollers 23 connecting driven member 3 to driving member 2 for rotation therewith, these rollers traveling around suitable openings 24 in member 2 arranged concentric with bushing 5 and eccentric 6. Flanged bushings 25 of hardened steel may be fitted into openings 24 to provide bearing surfaces for rollers 23. The flanges 26 of bushings 25 are arranged between gears 7 whereby the bushings are held in assembled relation. The parts are so related that the difference between the inside diameter of bushings 25 and the outside diameter of rollers 23 is equal to twice the eccentricity of eccentric 6 or the throw thereof, so that as eccentric 6 rotates and driving member 2 drives or causes rotation of driven member 3 by means of the rollers 23 connecting these members for rotation together, rollers 23 will travel around bushings 25 and rotate upon their respective pins 21. Tie members 21' having enlarged portions 22' arranged between parts 19 for the purpose of holding the same in proper spaced relation, extend through these parts as shown. Nuts 27, screwed upon the ends of members 21' serve to hold parts 19 securely together. Suitable counterweights 28 may be arranged as shown, on opposite sides of eccentric 6 with their centers of gravity opposite the center of gravity of eccentric 6. A suitable pin 29 may be passed through the counterweights and eccentric 6 for the purpose of holding these parts against rotary movement with respect to each other.

One of the collars 20 of driven member 3 may be extended, as shown in Fig. 2, and provided with any suitable means (not shown) for utilizing the rotary movement of member 3, which movement or course will be the same as that of driving member 2 and at the reduced rate.

Casing 4 may be provided with a suitable opening closed by a plug 30 for admitting lubricating oil into the same, and a similar opening closed by a plug 31 for draining the casing.

Access may be had to the interior of the device by removing nuts 17' associated with the half 10 of casing 4. This half may then be readily removed. The press fit of pins 16 in the half 9 of casing 4 serves to hold the pins in position when the half 10 is removed. The nuts 27 on the right-hand side of the device, as viewed in Fig. 2, may then be removed and the corresponding part 19 of driven member 3 removed, this being permitted by the loose fit of the ends of pins 21 and 21' in this part. The drive shaft 1 may then be disconnected from the source of power and driving member 2, eccentric 6, counterweights 28, and shaft 1 removed as a unit. From the foregoing it will be seen that a speed reducer has been provided which may be readily assembled or disassembled, which has many advantages over those heretofore used as regards simplicity of construction and ease of operation, and in which the sliding friction which has heretofore taken place between the driving member and the casing therefor has been eliminated.

In Figs. 4 and 5, a modification is shown in which the rollers corresponding to rollers 17 of Figs. 1 and 2 are journaled in the driving member. In this construction the parts 7' of the driving member 2' are made of thin plate and are connected by pins 16'' upon which are journaled rollers 17'. The flanges 26' of bushings 25' are increased in width, as shown, to correspond with the decrease in thickness of parts 7' over the thickness of the members or gears 7 in Fig. 2. The flange 8' of bushings 5' is likewise increased in thickness for the same reason. An annular ring 32 provided with teeth 33 arranged to mesh or coact with rollers 17' is fitted between the halves 9' and 10' of the casing, these parts being held together and against movement with respect to each other by any suitable means such as bolts 34 passing through the same and provided with nuts 35 screwed to the ends thereof.

In the modification shown in Figs. 6 and 7 each of the pins 36, corresponding to pins 16 in Fig. 2, carry two rollers 37. The use of two or more rollers on each of the pins 36 increases the bearing surface of the rollers with the teeth of driving gears 39 and thereby prevents excessive strain upon the various parts when the load on the driven member is comparatively great. It will be obvious to those skilled in the art that the continuity of action or ease of operation of the device will be greater as the number of rollers 37 is increased. Upon increasing the number of pins 36 and rollers 37, their respective diameters of course decrease a corresponding amount. For the purpose of permitting use of a greater number of pins 36 and rollers 37 having comparatively small diameters, in the manner shown in Figs. 6 and 7, while at the same time retaining all the advantages of the strength and rigidity of the shorter pins 16 in Fig. 2, suitable means such as an annular supporting member 40 provided with openings 41 through which pins 36 pass is arranged between the halves of the casing 42 and held against rotary movement with respect thereto by any suitable means such as dowel pins 43 passing through suitable openings 44 in member 40 and into the halves of the casing, as shown. The pins 36 are thereby supported intermediate their respective ends and can be of small diameter to permit use of a greater number of rollers 37 without sacrificing any of the advantages of the shorter pins 16 in Fig. 2 as regards strength and rigidity.

Various changes in the size, shape and arrangement of the parts may be adopted without departing from the spirit of the invention or the scope of the claims.

The invention claimed is:

1. In a speed reducer of the character described, the combination with a drive shaft, a driven member mounted for rotation about the axis of rotation of said shaft, and a casing, of a driving member comprising a flanged bushing eccentrically mounted upon said shaft and similarly-shaped parts arranged at either side of said bushing and in concentric relation with respect thereto, the flange of said bushing being arranged between said parts, and means for holding said parts and bushing in assembled relation, said driving member cooperating with said casing and said driven member to effect differential rotary movement of the latter upon rotation of said shaft.

2. In a speed reducer of the character described, the combination with a drive shaft, a driven member mounted for rotation about the axis of rotation of said shaft, and a casing, of a driving member comprising a flanged bushing eccentrically mounted upon said shaft, similarly-shaped parts arranged at either side of said bushing and in concentric relation with respect thereto, the flange of said bushing being arranged between said parts, means for holding said parts and bushing in assembled relation, rollers connecting said driving and driven members for rotation together, and other flanged bushings adapted and arranged to provide bearings for said rollers, the flanges of said last-mentioned bushings being arranged between said parts of said driving member whereby said bushings are held in operative relation, said driving member cooperating with said casing and rotating with respect thereto upon rotation of said shaft.

3. In a speed reducer of the character described, a drive shaft, a driving member eccentrically mounted upon said shaft, a driven member mounted for rotation about the axis of rotation of said shaft and associated with said driving member for rotation therewith, a two-part casing for said members, a plurality of pins having their opposite ends fitted into and supported by the respective parts comprising said casing, rollers arranged upon said pins and coacting with said driving member to effect rotary movement therewith respect to said casing upon rotation of said shaft, and means for holding said parts of said casing together, said casing parts being so constructed and arranged that upon removal of one said driving member may be removed from operative association with the other by movement of said driving member in a direction parallel to the axis of rotation of said shaft.

4. In a speed reducer of the character described, a drive shaft, a driving member comprising a plurality of similar parts eccentrically mounted upon said shaft, means for holding said parts in spaced relation and for connecting the same for rotation together, a driven member mounted for rotation about the axis of rotation of said shaft and associated with said driving member for rotation therewith, a two-part casing for said members, a plurality of pins having their opposite ends fitted into and supported by the respective parts comprising said casing, rollers arranged upon said pins, said parts of said driving member engaging said rollers at points immediately adjacent to said parts of said casing and coacting with said rollers to effect rotary movement of said driving member with respect to said casing upon rotation of said shaft, and means for holding said parts of said casing together, said casing parts being so constructed and arranged that upon removal of one said driving member may be removed from operative association with the other by movement of said driving member in a direction parallel to the axis of rotation of said shaft.

5. In a speed reducer of the character described, the combination with a drive shaft, a driving member eccentrically mounted upon said shaft, a driven member mounted for rotation about the axis of rotation of said shaft and associated with said driving member for rotation therewith, and a casing, of a plurality of pins supported at the ends thereof by said casing, a plurality of rollers arranged upon each of said pins, and means adapted and arranged to support said pins intermediate the ends thereof, said pins and rollers cooperating with said driving member to effect rotary movement thereof with respect to said casing upon rotation of said shaft.

6. In a speed reducer of the character described, the combination with a drive shaft, a driving member eccentrically mounted upon said shaft, a driven member mounted for rotation about the axis of rotation of said shaft and associated with said driving member for rotation therewith, and a casing, of means forming a driving connection between said casing and said driving member whereby the latter is caused to rotate with respect to said casing upon rotation of said shaft, said means comprising a plurality of pins supported intermediate their ends and a plurality of rollers arranged upon each of said pins.

7. In a speed reducer of the character described, the combination with a drive shaft, a driving member eccentrically mounted upon said shaft, a driven member mounted for rotation about the axis of rotation of said shaft and associated with said driving member for rotation therewith, and a casing, of means forming a driving connection between said casing and said driving member whereby the latter is caused to rotate with respect to said casing upon rotation of said shaft, said means comprising a plurality of pins supported intermediate their ends by said casing and a plurality of rollers arranged upon each of said pins.

8. In a speed reducer of the character described, a drive shaft, a driving member comprising a plurality of similar parts fixed against rotation with respect to each other and eccentrically mounted upon said shaft and cooperating with said casing whereby rotation of said member with respect to the latter is caused upon rotation of said shaft, a driven member comprising two similarly-shaped parts arranged on opposite sides of said driving member and mounted for rotation about the axis of rotation of said shaft, and means connecting said parts of said driven member for rotation together and for rotation with said driving member, said means extending through and coacting with said parts comprising said driving member.

In witness whereof I hereto affix my signature.

ALFRED LAUKHUFF.